(No Model.)
T. B. JEFFERY.
VELOCIPEDE SADDLE.
No. 408,718. Patented Aug. 13, 1889.
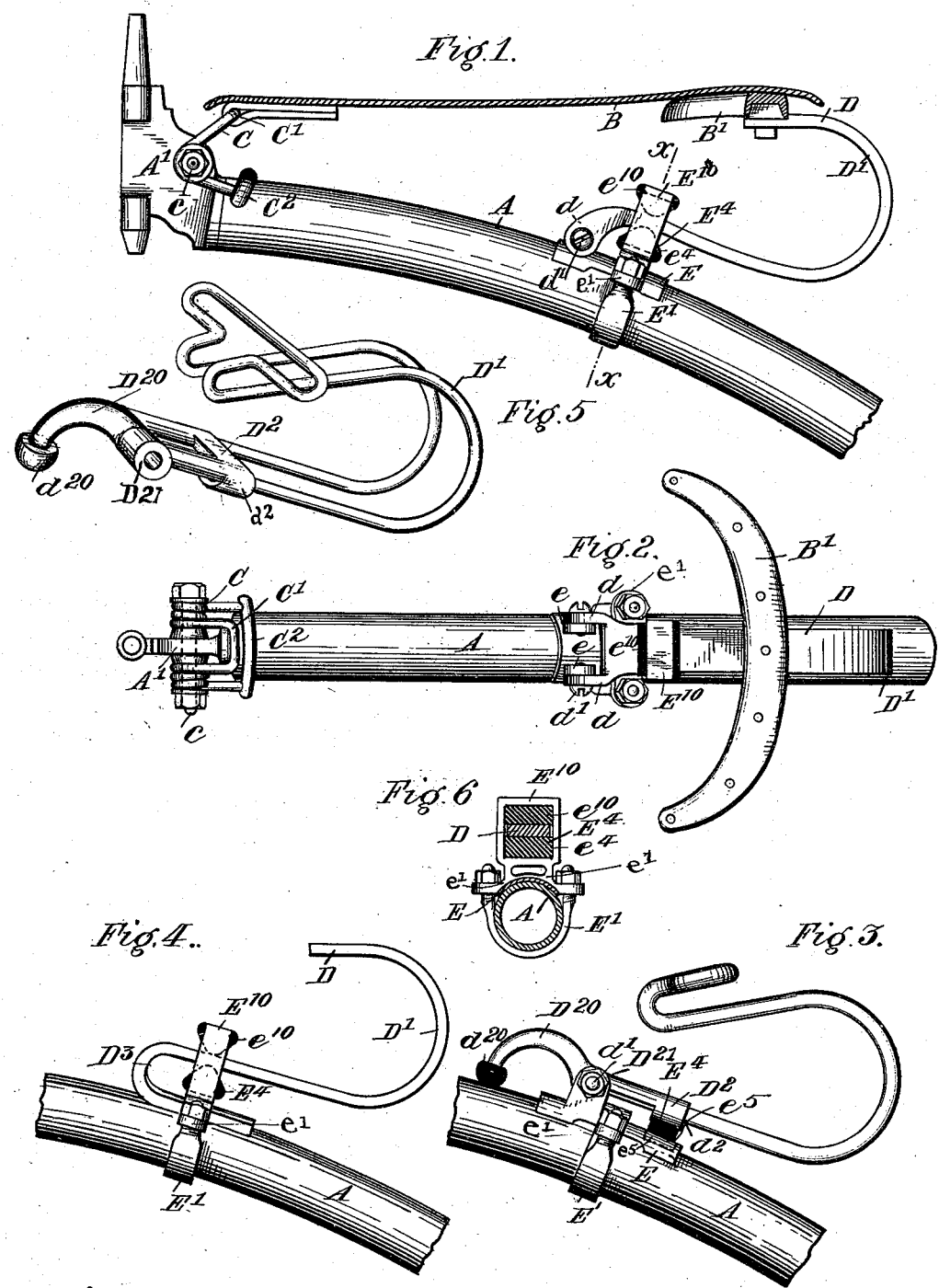

UNITED STATES PATENT OFFICE.

THOMAS B. JEFFERY, OF CHICAGO, ILLINOIS.

VELOCIPEDE-SADDLE.

SPECIFICATION forming part of Letters Patent No. 408,718, dated August 13, 1889.

Application filed December 4, 1886. Serial No. 220,686. (No model.)

*To all whom it may concern:*

Be it known that I, THOMAS B. JEFFERY, a citizen of the United States, residing at Chicago, in the county of Cook and State of Illinois, have invented certain new and useful Improvements in Velocipede-Saddles, which are fully set forth in the following specification, reference being had to the accompanying drawings, forming a part thereof, wherein—

Figure 1 is a side elevation. Fig. 2 is a plan with the seat removed. Fig. 3 is a side elevation of a modified form. Fig. 4 is a side elevation of a different modification. Fig. 5 is a perspective of a piece which forms the pivot and affords securement for the rear spring in the form illustrated in Fig. 3, the rear spring of that form being also shown. Fig. 6 is a section through $x\ x$, Fig. 1.

In the above-described figures this invention is represented as applied to a bicycle, of which A is the backbone, constituting, with reference to the saddle, the perch or support. It terminates in the usual neck A' at the forward end.

B is the seat, of leather or other flexible material, which is stretched tight between its front and rear fastenings. At the forward end it is secured to the spring C, whose form will be hereinafter described, and at the rear end it is secured to the segment B', which is fastened to the end of the rear spring D for that purpose.

The leading purpose of this invention may be understood upon considering what would be the effect of weight pressing upon the flexible seat stretched between the spring-supports if said supports were secured rigidly to the perch at their lower ends. The tendency of the springs is to draw the leather seat taut, and when the weight of the rider is located on the seat between the springs the seat is caused to sag and slightly flex the springs. Both the elasticity of the seat and that of the spring-supports contribute to render the seat sufficiently yielding for ease in riding. If, however, the springs yield too easily, the seat will sag too far. The rear spring is therefore made very stiff. When the weight is thrown far back on the seat, so as to be located substantially over the end of the rear spring, all the elasticity of the seat itself and of the front spring becomes unavailable, and the very stiff rear spring affords too little relief. As this position is often assumed, it is desirable to so construct and support the seat that all the elasticity of both springs and of the flexible seat itself shall be available to ease the rider in whatever position on the seat his weight may rest. In order to accomplish this purpose the rear spring is so made that the entire retreating bow D' may have an oscillating motion about a pivot forward of the vertical plane of the fastening of the flexible seat to the upper end of said bow and below the horizontal plane of said fastening, whereby when the weight resting on said upper end causes the spring to descend said end moves in an arc rearward as well as downward, and so stretches the seat, thereby rendering its tensile elasticity available, and draws upon the forward spring in the same manner as when the weight rests in the sag of the saddle, and so brings into action the flexile elasticity of the forward spring.

The described movement of the rear spring may be attained either by pivoting it to the perch at the forward lower end, a little forward of the vertical plane of the seat-fastening, or by looping or bowing it at that point. The former structure is shown in Figs. 1 and 3 and the latter in Fig. 4.

E is a plate, which is fastened to the perch in any convenient manner, but preferably by a clamping-yoke E'. It has the lugs $e\ e$, which afford bearings for the pivot of the rear spring. In the form shown in Fig. 1 the rear spring is forged and made to terminate in the lugs $d\ d$, which are connected to the lugs $e\ e$ by pivots $d'$. In the form shown in Fig. 3 the spring is made of spring wire or rod and provided with the clip $D^2$, which has the sockets $d^2\ d^2$ to receive the ends of the spring and the pivotal shaft $D^{21}$, adapted to fit between the lugs $e\ e$ and be secured by the pivots $d'$. In the form shown in Fig. 4 the spring becomes approximately S-shaped, and the lower end is formed to fit the perch and be clamped thereto in the same manner as the plate E, and said plate is dispensed with. The bend or bow $D^3$ in this form corresponds in function to the hinge-joint made by the lugs $d$ and $e$ and their pivot in the form shown in Figs. 1 and 3. In any of these forms it is necessary to provide a stop to prevent the upper end of the spring being drawn forward by the longitudinal stress of the seat B and the force of the forward spring acting in the same direction. In the form shown in Fig. 1 this stop is most conveniently formed by the loop $E^{10}$, extended from the clamp $e'$ of the clamping-yoke $E'$ over the lower branch of the spring D rearward from its pivot.

In the form shown in Fig. 3 the clip $D^2$ has the extension $D^{20}$, which reaches forward of the pivot and stops against the plate E, (or directly against the perch, on which the plate is only a cover, and may be omitted at that part.)

In order that a limit may be put to the strain to which the leather seat shall be exposed, a stop is provided also against the downward movement of the rear spring. The perch itself may serve as such stop; but it is desirable that even such stop should have a slightly-yielding character, and I prefer to provide for that purpose a rubber block, as $E^4$, secured in any convenient manner, as by being inserted in the cavity $e^4$ in the yoke $E'$ under the spring D in Fig. 1 or in the like cavity $e^5$ in the plate E in Fig. 3. It is desirable, also, to provide for the stoppage in the other direction by contact of some soft and elastic material, as rubber, and for that purpose I form a socket in the under side of the loop $E^{10}$ and insert therein a rubber cushion $e^{10}$, and in the form shown in Fig. 1 I provide the stop $D^{20}$ with a rubber tip $d^{20}$.

In the structure arranged for the purpose described it is essential that the forward spring shall be capable of reacting not only vertically against the weight, but also horizontally against the strain which is exerted longitudinally with relation to the seat B. The most convenient and conveniently-applied form of spring for the first purpose is a spiral coil whose axis is transversely horizontal, and whose ends are stopped one against the perch and the other against the seat, and I prefer to make two such seat-springs C C of one piece of wire, the loop $C'$ connecting them at the top, extending across the perch, and the ends of the wire both being stopped against the perch, and for the purpose of such stoppage being connected by the yoke $C^2$. In order that such a spring should be capable also of reacting against the longitudinal strain of the seat, it is necessary that it should be secured to the perch, as well as stopped against it, and I find it most convenient to effect this securement by passing a bolt $c$ through the spiral coils C C and through the neck $A'$, thereby securing the spring in position, and also affording a pivot about which the torsion of the spiral coils will occur when the strain of the seat draws the loop $C'$ rearward.

I have described the springs as front and rear, respectively, according to their representation in the drawings; but in some forms of velocipede their position might be reversed, and in some forms the style of spring shown as the rear spring might be employed at both ends of the seat.

I claim—

1. In combination with the perch, an elastically-tensile seat and its support at one end secured to the perch, the spring-support at the other end pivoted to the perch at a point below the seat and between the vertical planes of its ends, and a stop to limit the motion of said support toward the other end, substantially as set forth.

2. In combination with the perch, an elastically-tensile seat and its spring-support at one end secured to the perch and yielding longitudinally with respect to the seat, the spring-support at the other end pivoted to the perch at a point below the seat and between the vertical planes of its ends, and a stop to limit the motion of said support toward the other end, substantially as set forth.

3. In combination with the perch, the clip pivoted thereto and having sockets $d^2$, and the spring bowed and secured above to the seat and having its ends secured by being inserted in said sockets, said clip being provided with the extension $d^{20}$, which projects forward of its pivot and is stopped against the perch, substantially as set forth.

4. In combination with the perch, the seat and its support at one end secured to the perch, the support at the other end also secured to the perch and adapted to oscillate in a vertical plane, and the yielding stop secured to the perch and extended above said oscillating seat-support to limit yieldingly its upward movement, substantially as set forth.

5. In combination with the perch, the seat and its support at one end secured to the perch, its support at the other end pivoted to the perch at one end and at the other end secured to the seat and adapted to oscillate vertically, and the yielding stop secured to the perch and extended above said oscillating support to limit yieldingly the upward movement, substantially as set forth.

6. In combination with the perch, the seat and its support at one end secured to the perch, the support at the other end also secured at one end to the perch and at the other end to the seat and adapted to oscillate vertically, and a yielding stop secured to the perch and located below said oscillating support to limit yieldingly its downward movement, substantially as set forth.

7. In combination with the perch, the seat and its support at one end secured to the perch, its support at the other end also secured at one end to the perch and at the other end to the seat and yielding intermediately, and a stop to limit the downward movement of said support, substantially as set forth.

8. In combination with the perch and the seat, the spring comprising the spiral coil C, the wire running from one end of it being stopped on the seat and that running from the other end being stopped on the perch, and the entire spring being secured to the perch on a pivot passing through the spiral coil, substantially as set forth.

9. In combination with the perch and the seat, the spring comprising the two spiral coils C C, stopped above against the seat and connected below by the yoke C², which constitutes a means of stopping the lower ends on the perch, substantially as set forth.

10. In combination with the perch and the seat, the spring comprising the spiral coils C C, formed of one piece of wire and joined by the loop C′ and having said loop connected to the seat, and the yoke C², connecting the ends of the wire of which the coils are formed and serving to stop the spring on the perch, said spring being secured to the perch on a pivot through the coils, substantially as set forth.

In testimony whereof I have hereunto set my hand, in the presence of two witnesses, at Chicago, Illinois, this 11th day of November, A. D. 1886.

THOS. B. JEFFERY.

Witnesses:
R. PHILIP GORMULLY,
CHAS. S. NEEROS.